United States Patent
Paterson et al.

(10) Patent No.: US 11,480,613 B2
(45) Date of Patent: Oct. 25, 2022

(54) METHOD AND/OR SYSTEM FOR TESTING DEVICES IN NON-SECURED ENVIRONMENT

(71) Applicant: Arm Limited, Cambridge (GB)

(72) Inventors: Richard Andrew Paterson, Thurgoland (GB); Rainer Herberholz, Great Abington (GB); Peter Andrew Rees Williams, Great Abington (GB); Oded Golombek, Even Yehuda (IL); Einat Luko, Herzliya (IL); Jeffrey Scott Boyer, Dripping Springs, TX (US)

(73) Assignee: Arm Limited, Cambridge (GB)

(*) Notice: Subject to any disclaimer, the term of this patent is extended or adjusted under 35 U.S.C. 154(b) by 13 days.

(21) Appl. No.: 17/127,846

(22) Filed: Dec. 18, 2020

(65) Prior Publication Data

US 2022/0196734 A1 Jun. 23, 2022

(51) Int. Cl.
| | |
|---|---|
| *G01R 31/3177* | (2006.01) |
| *G01R 31/3187* | (2006.01) |
| *G01R 31/317* | (2006.01) |
| *G01R 31/3185* | (2006.01) |
| *G01R 31/28* | (2006.01) |
| *H04L 9/08* | (2006.01) |

(52) U.S. Cl.
CPC ..... *G01R 31/3177* (2013.01); *G01R 31/2815* (2013.01); *G01R 31/3187* (2013.01); *G01R 31/31715* (2013.01); *G01R 31/31724* (2013.01); *G01R 31/318533* (2013.01); *G01R 31/318597* (2013.01); *H04L 9/0894* (2013.01)

(58) Field of Classification Search
CPC .......... G01R 31/3177; G01R 31/31724; G01R 31/3187; G01R 31/318597; G01R 31/2815; G01R 31/318533; H04L 9/0894

USPC ................... 714/727, 733, 724, 742
See application file for complete search history.

(56) References Cited

U.S. PATENT DOCUMENTS

| | | | |
|---|---|---|---|
| 5,818,848 A | 10/1998 | Lin et al. | |
| 6,968,420 B1 | 11/2005 | Giles et al. | |
| 8,015,448 B2* | 9/2011 | Jayabharathi | G11C 29/48 714/733 |
| 8,074,132 B2* | 12/2011 | Guettaf | G01R 31/31719 713/193 |
| 8,281,190 B2* | 10/2012 | Gunderson | G11C 29/16 714/736 |
| 8,677,196 B1* | 3/2014 | Gregor | G11C 29/1201 714/718 |
| 9,544,141 B2* | 1/2017 | Li | H04L 9/0866 |

(Continued)

OTHER PUBLICATIONS

Notification of Transmittal of the International Search Report the Written Opinion of the International Searching Authority, of the Declaration, App. No. PCT/EP2021/025497, dated Apr. 19, 2022, 17 pages.

*Primary Examiner* — John J Tabone, Jr.
(74) *Attorney, Agent, or Firm* — Berkeley Law & Technology Group, LLP

(57) ABSTRACT

Disclosed are methods, systems and devices for implementing built-in self-test (BIST) to be performed by an untrusted party and/or in an unsecure testing environment. In an embodiment, a test access port (TAP) on a device may enable a party to initiate execution of one or more BIST procedures on the device. Additionally, such a TAP may enable loading of encrypted instructions to be executed by one or more processors formed on a device under test.

18 Claims, 4 Drawing Sheets

(56) References Cited

U.S. PATENT DOCUMENTS

| | | | |
|---|---|---|---|
| 10,352,998 B2* | 7/2019 | Bowling | G06F 15/8061 |
| 10,496,506 B2* | 12/2019 | Fkih | H01L 23/58 |
| 2003/0172323 A1* | 9/2003 | McIntosh | H04L 1/22 |
| | | | 714/43 |
| 2004/0034823 A1* | 2/2004 | Watkins | G06F 21/52 |
| | | | 714/724 |
| 2005/0289355 A1 | 12/2005 | Kitariev et al. | |
| 2006/0021033 A1* | 1/2006 | Huynh | G06F 21/6218 |
| | | | 726/22 |
| 2007/0104000 A1* | 5/2007 | Lin | G11C 29/72 |
| | | | 365/200 |
| 2008/0016395 A1 | 1/2008 | Feng | |
| 2009/0113114 A1 | 4/2009 | Berenbaum et al. | |
| 2018/0145041 A1* | 5/2018 | Fkih | G06F 11/27 |
| 2018/0348299 A1 | 12/2018 | Mistry et al. | |
| 2019/0278918 A1* | 9/2019 | Boivie | H04L 9/3234 |

\* cited by examiner

METHOD AND/OR SYSTEM FOR TESTING DEVICES IN NON-SECURED ENVIRONMENT

BACKGROUND

1. Field

Disclosed are devices and techniques for testing of devices such as integrated circuit devices in a manufacturing process.

2. Information

In the course of manufacturing integrated circuit (IC) devices, test procedures may be performed at multiple different stages as a workpiece progresses in a process chain from wafer fabrication through final test after packaging, for example. In particular implementations, testing of IC devices at different points in a process chain may be performed, at least in part, using built-in self test (BIST) procedures.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
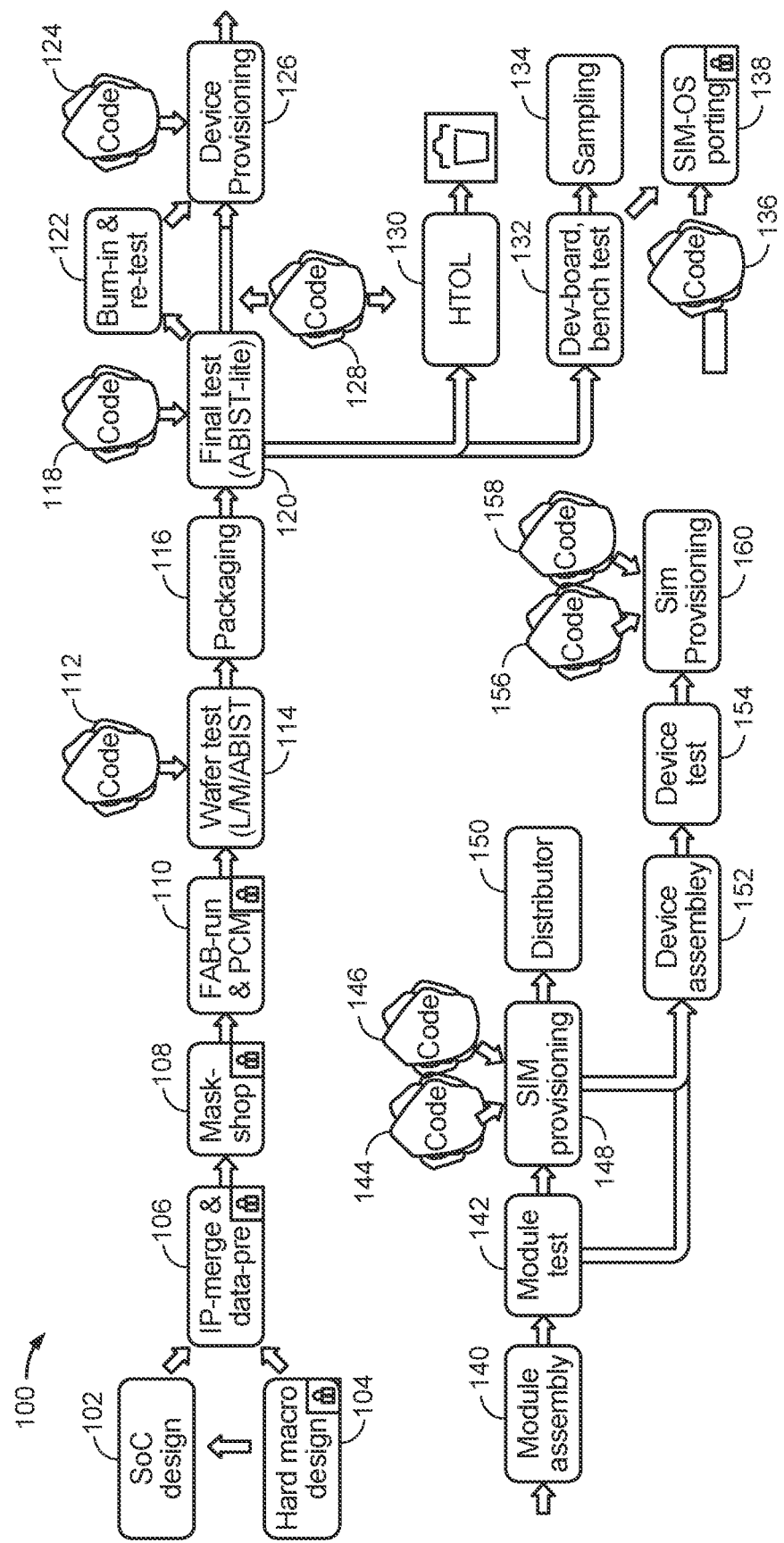
FIG. 1 is a flow diagram of a process for manufacturing a device according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

As pointed out above, in particular implementations testing of an integrated circuit (IC) device may occur at multiple different points in a process chain using built-in self-test (BIST) procedures. A "BIST procedure" as referred to herein means a procedure executed by an entity within a device or system to test components (e.g., hardware or software elements of a computing system) of the device or system to identify faults and/or potential faults. In particular implementations, a BIST procedure may specifically test logic circuitry (LBIST), power circuitry (PBIST), memory circuitry (MBIST) and/or analog circuitry (ABIST). It should be understood, however, that these are merely examples of BIST procedures that may be performed in connection with a device at points in a manufacturing process chain, and claimed subject matter is not limited in this respect.

According to an embodiment, an IC device may comprise a so-called system on a chip (SoC) in which multiple components of a self-contained processing system are formed in a single circuit die, for example. In some scenarios, BIST procedures applied to an SoC device may reveal design features and/or detailed test results that are proprietary and/or intended to be maintained in secrecy by an owner and/or provider of intellectual property from which the SoC device is manufactured. In a particular implementation in which an owner and/or provider of such intellectual property and a manufacturer initiating a BIST procedure are not the same entity or party, the owner and/or provider of the intellectual property may take precautions to ensure that proprietary information is maintained as secret. For example, an owner and/or provider of intellectual property may take measures to ensure that a party initiating a BIST procedure in a manufacturing chain is a party that can be trusted to conduct the BIST procedure properly and without disclosure of design features and/or certain details of test results, for example. Unfortunately, requiring parties performing BIST for a device to be parties trusted to conduct BIST procedures properly and/or without disclosure of proprietary information may increase overall manufacturing costs significantly over use of parties that would not meet such requirements of trustworthiness.

According to an embodiment, features of a manufacturing process may enable an owner and/or provider of intellectual property to allow BIST procedures at different points in a manufacturing chain to be initiated and/or conducted by parties that are not necessarily parties that are to be trusted to conduct such BIST procedures properly and/or maintain secrecy of proprietary information. In a particular implementation, for example, features of a device to be tested may include one or more BIST engines and/or employ securely signed BIST software to maintain a chain of trust throughout portions of a manufacturing process without disclosure of certain proprietary information to a party that initiates and/or conducts a BIST procedure. In another particular implementation, a party may initiate and/or conduct a BIST procedure on a device via a test access port (TAP) formed on the device. While a party initiating and/or conducting a BIST procedure may access through the TAP test results stored in test registers on a device to be tested, the TAP may not enable access to scan chains and some memories formed in the device to be tested.

FIG. 1 is a flow diagram of a process 100 for manufacturing a device according to an embodiment. Here, a party may provide its intellectual property in the form of hard macro design 104 to be incorporated into a design 102 for an SoC device. Following incorporation of hard macro design 104 at block 106, a mask for a device to be manufactured may be formed at block 108 to enable wafer fabrication at block 110. Wafer test and packaging may then be performed at blocks 114 and 116, respectively. In a particular implementation, blocks 106, 108 and 110 may be performed by parties and/or in facilities that may be trusted to maintain secrecy of intellectual property expressed in hard macro design 104 (and/or incorporated into design 102). As discussed below in connection with particular embodiments, test procedures may be performed at block 114 by parties and/or facilities that are not trusted to maintain secrecy of test structures and/or intellectual property expressed in hard macro design 104 incorporated into a tested product. Following packaging at block 116, additional sub-processes at 118, 120, 122, 124, 126, 128, 130, 132, 134, 136 and 138 may be performed to provide a packaged IC component for integration in a product. According to an embodiment, a comprehensive set of BIST procedures may be executed prior to completion of processing at block 120 to ensure that packaging has not broken a device being manufactured. As such, block 120 may perform an abridged ABIST procedure (e.g., "ABIST-lite") to, for example, identify any faults arising from packaging at block 116. Sub-processes at 140, 142, 144, 146, 148, 150, 152, 154, 156, 158 and 160 may include integration of such a packaged IC component assembly in a product, as well as final testing and provisioning of features by loading of executable code.

Figure 2A:
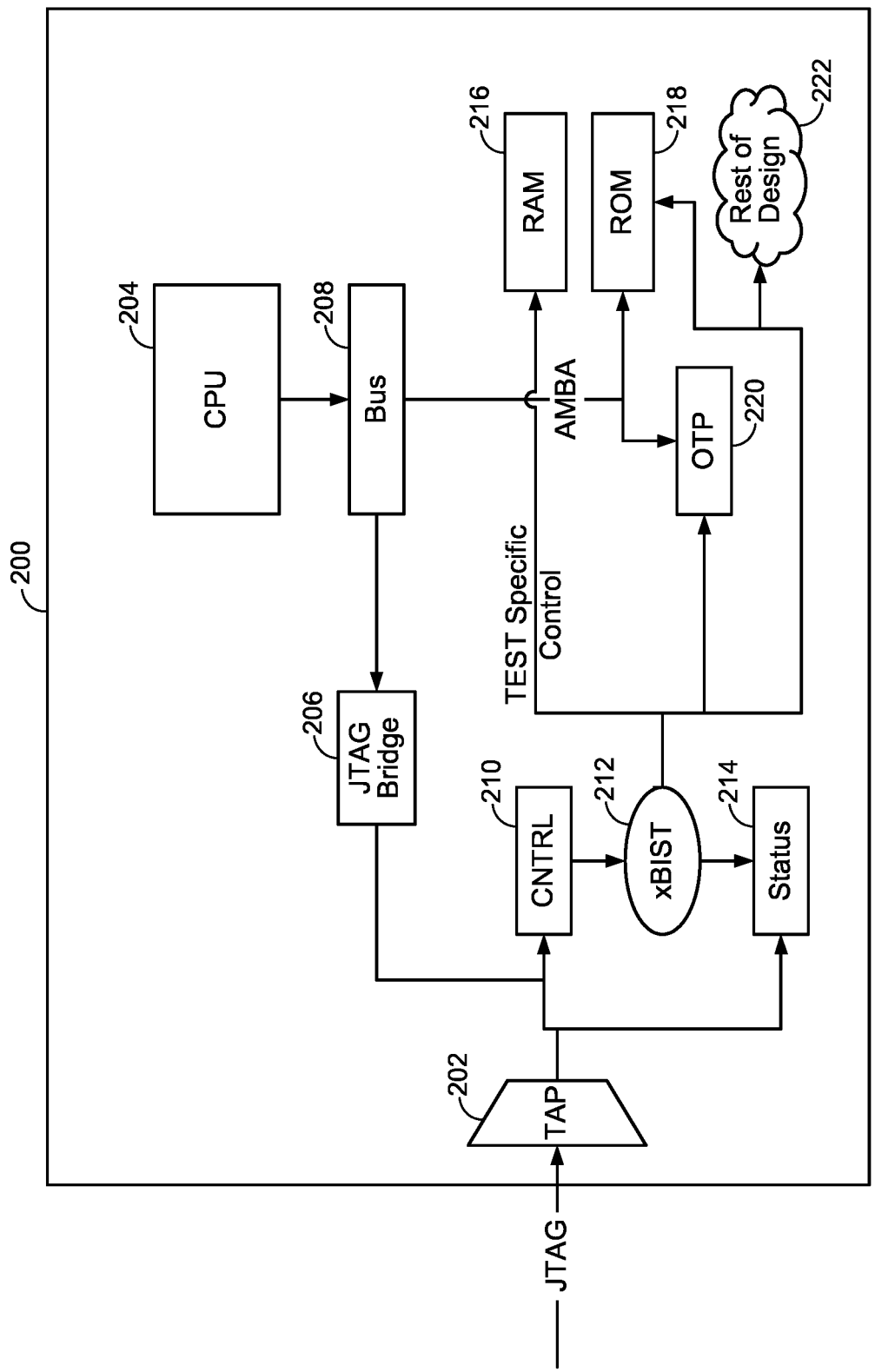
FIGS. 2A and 2B are schematic diagram of a device to be tested according to an embodiment.

FIG. 2A is a schematic diagram of a device 200 to be tested according to an embodiment. In a particular implementation, device 200 may comprise a device that is to be tested at block 114 of process 100 (FIG. 1). Also, device 200 may comprise an IC device formed (e.g., at block 110, FIG. 1) in a single circuit die using any one of several presently available processes (e.g., processes for forming IC devices from a complementary metal oxide semiconductor (CMOS) material and/or other suitable material) and/or processes that may be implemented in the future. Features of device 200 may be expressed, for example, as data and/or instructions embodied in various machine-readable media, in terms of their behavioral, register transfer, logic component, transistor, layout geometries, and/or other characteristics (e.g., at block 106, FIG. 1). Formats of files and other objects in which such circuit expressions to implement device 200 may include, but not necessarily be limited to, formats supporting behavioral languages such as C, Verilog, System C, HLS and VHDL, formats supporting register level description languages like RTL, and formats supporting geometry description languages such as GDSII, GDSIII, GDSIV, CIF, MEBES and any other suitable formats and languages.

Device 200 may comprise a computing device to include central processing unit (CPU) 204, bus 208, read-only memory (ROM) 218 and random access memory (RAM) 216. In alternative implementations, devices for RAM 216 and/or ROM 218 may be implemented as a non-volatile random access memory (NVRAM). In an embodiment, instructions stored in ROM 218 may be loaded to RAM 216 and executed by CPU 204 responsive to an event such as a startup event. In one embodiment, a BIST procedure may be prevented from executed if, for example, the BIST procedure is in an unknown state. This may provide an additional security check against malicious code and/or leak of secured information. Additionally, device 200 may comprise features and/or circuitry to facilitate BIST procedures including BIST engines 212, control registers 210, status registers 214, TAP 202, JTAG bridge 206, one-time programmable (OTP) registers 220. Device 200 may also include additional circuitry and/or features in rest of design 222. In an implementation, control registers 210 may be used to initiate operation of BIST engines 212. Status registers 214 may record results of procedures executed by BIST engines 212 (e.g., in a results signature). In an example implementation, such test results in status registers 214 may be read accessible by CPU 204 and/or TAP 202, but may not be write accessible by CPU 204 or TAP 202. Additionally, status registers 214 may be configured to maintain a persistent state through a recycle event, and therefore maintain such a persistent state over a sequence of multiple executions of BIST procedures. Once CPU 204 determines that results recorded in status registers 214 indicates a pass or a fail of a BIST procedure, OTP registers 220 may be used to record final pass/fail results. In an implementation, OTP registers 220 may be set only once, and then maintain a persistent state thereafter. According to an embodiment of an example process, a device that has failed an initial BIST procedure may be re-tested to account for environmental factors contributing to such failure of the initial test. In an implementation, once a bit in OTP registers 220 for a device is, the device may be permanently marked as passing or failing.

In an embodiment, BIST engines 212 comprise logic and/or circuitry to execute BIST procedures on device 200 such as, for example, logic BIST (LBIST) and/or memory BIST (MBIST). As discussed below, other BIST procedures (e.g., analog BIST (ABIST)) may be performed under control of instructions and/or commands which may be loaded through TAP 202 to RAM 216 and executed by CPU 204. In an embodiment, execution of a BIST procedure (e.g., by BIST engines 212 and/or instructions executed by CPU 204) may include storage of testing results in status registers 214. According to an embodiment, TAP 202 may comprise a controller formed and/or configured according to and/or substantially compatible with Joint Test Action Group (JTAG) and/or IEEE std. 1149.1 specifications. Additionally, JTAG bridge 206 may enable communication with bus 208 to, for example, load executable instructions to RAM 216 for execution of a BIST procedure. JTAG bridge 206 may also be used by CPU 204 to access control register 210 and status register 214.

Figure 2B:
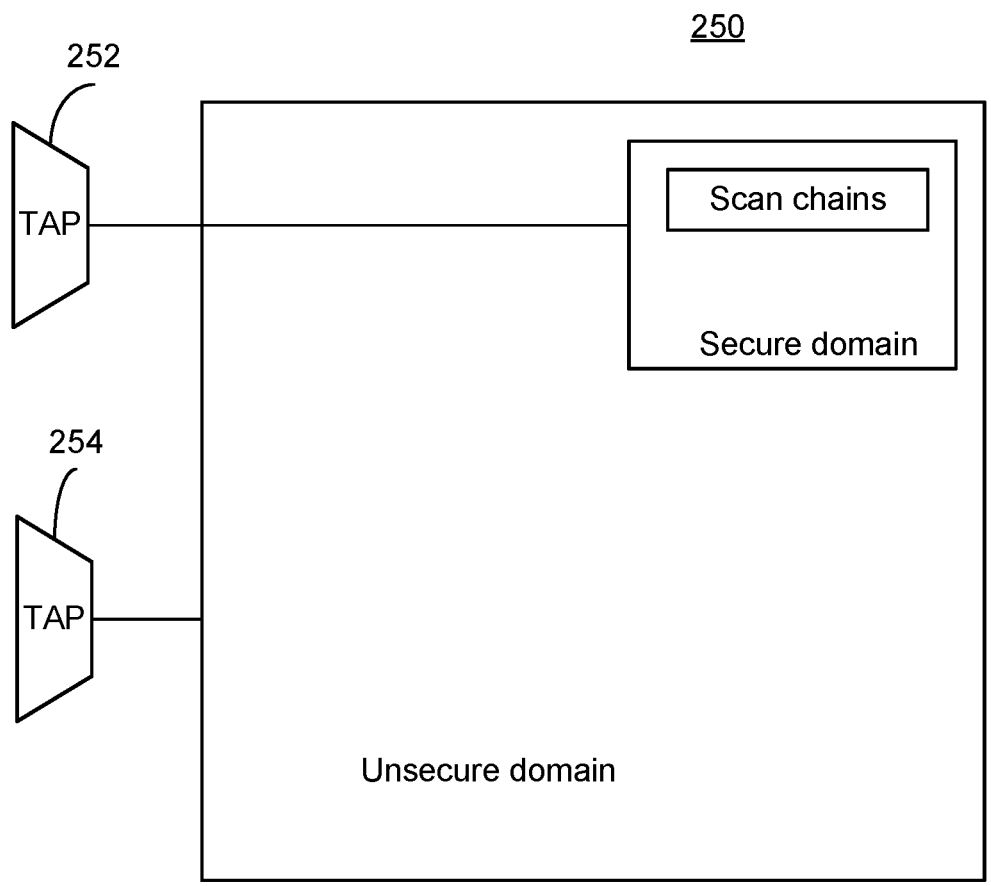

According to an embodiment, some aspects of device 200 may be defined to reside in a "secure domain" in that access (e.g., read access, write access and/or control) may be controlled and/or limited to particular entities (e.g., residing on or off device 200). Remaining aspects of device 200 (e.g., aspects of device 200 not in a secure domain) may be defined to reside in an "unsecure domain" in that access may be less controlled and/or less limited. In one example implementation, device 200 may comprise multiple TAPs to include TAP 202 as a first TAP, along with other TAPs (not shown). For example, as shown in FIG. 2B, TAP 202 may comprise a first TAP 252 that is to reside in a secure domain of device 250 while one or more other TAPs 254 may reside in an unsecure domain of device 250. For example, device 250 may comprise multiple TAPs that are configured hierarchically such that TAP 252 defined to be in a secure domain is positioned at a lower level in a hierarchy while one or more additional TAPs 254 are defined to be in an unsecure domain at a higher level in the hierarchy.

Figure 3:
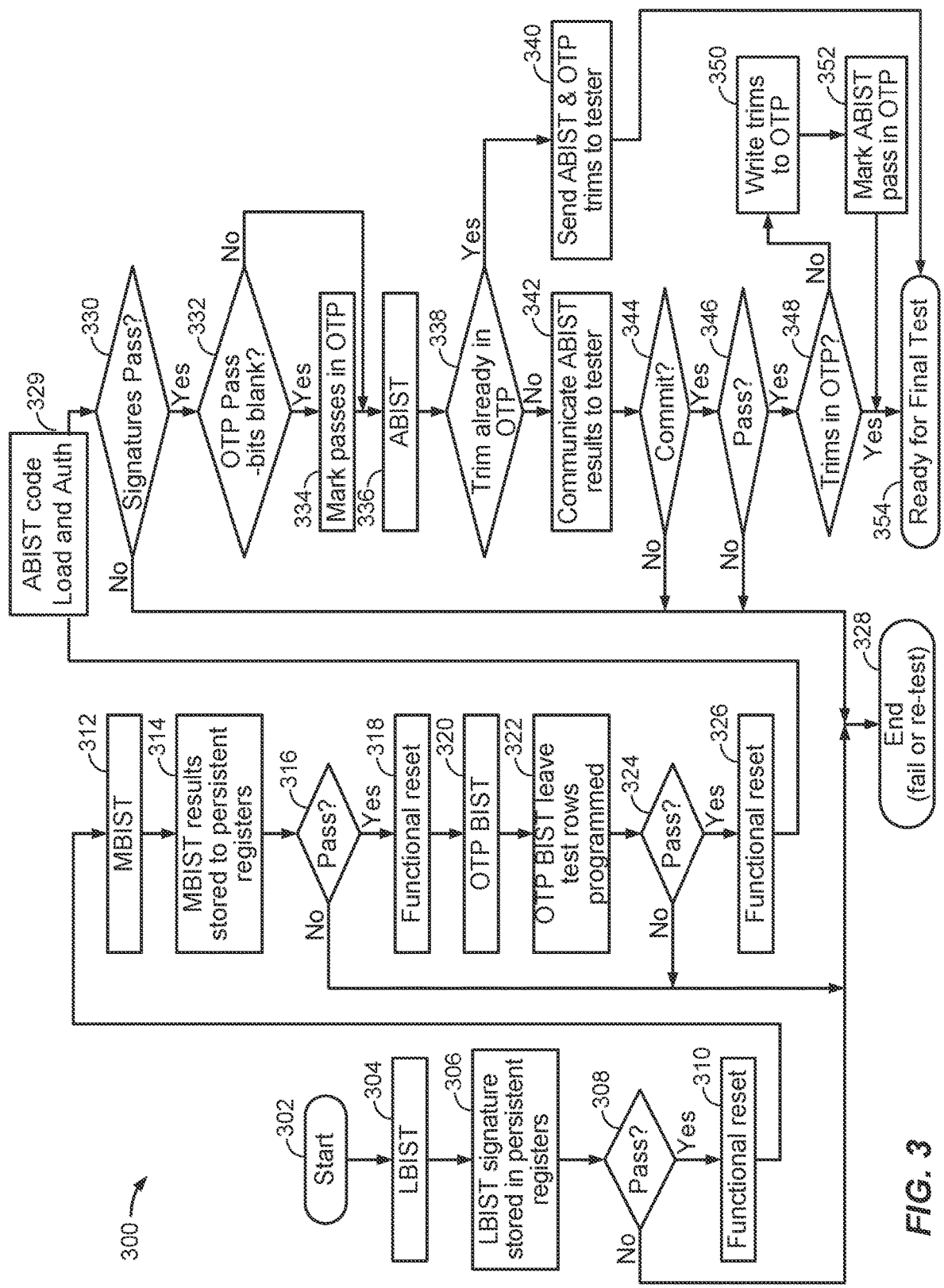
FIG. 3 is a flow diagram of a process to test a device according to an embodiment.

FIG. 3 is a flow diagram of a process 300 to test a device according to an embodiment. In a particular implementation, process 300 may be performed, in whole or in part, at block 114 of process 100 (FIG. 1) and/or for execution of a BIST procedure for a device such as device 200 (FIG. 2A). According to an embodiment, aspects of process 300 may be initiated and/or controlled responsive to signals and/or messages provided through a TAP (e.g., TAP 202) formed on a device under test. For example, process 300 may commence at start 302 responsive to receipt of one or more signals at a TAP from a party that is not trusted to maintain proprietary information (e.g., design details and/or test parameters) as secret. Additionally, process 300 may be performed in an unsecure facility.

LBIST procedure 304, MBIST procedure 312 and OTP BIST procedure 320 may be performed based on and/or according to logic and/or circuitry embedded in a device being tested such as logic and/or circuitry formed in BIST engines 212. While process 300 is shown as having LBIST procedure 304, MBIST procedure 312 and OTP BIST procedure 320 being performed in a particular order, it should be understood that LBIST procedure 304, MBIST procedure 312 and OTP BIST procedure 320 may be performed formed in any order, and claimed subject matter is not limited in this respect. Results of tests at LBIST procedure 304, MBIST procedure 312 and/or OTP BIST procedure 320 may be stored in persistent status registers (e.g., status registers 214) at blocks 306, 314 and 322, respectively. Additionally, upon conclusion of OTP BIST procedure 320, block 322 may comprise permanently setting bits in one or more OTP registers (e.g., OTP registers 220).

According to an embodiment, bits in OTP registers 220 may be testable (e.g., using procedures that are executable by BIST engines 212). For example, one or more words in an implementation of OTP registers 220 may include a test bit that is programmable if OTP registers 220 are put into a test mode. Programing such a bit in OTP registers 220 and reading back an expected value may provide confidence that an analog circuit to program implement OTP registers 220 the OTP words has been manufactured correctly. If LBIST procedure 304, MBIST procedure 312 or OTP BIST procedure 320 fail (as determined respectively at diamonds 308, 316 or 324, respectively), process 300 may terminate at 328 with an indication of a failed test and/or initiation of a re-test. Following passage of LBIST procedure 304, MBIST procedure 312 or OTP BIST procedure 320, one or more states of a tested device (e.g., states defined at least in part by BIST engines 212) may be reset and/or re-initialized at block 310, 318 and/or 326. In a particular implementation, spare memory rows (e.g., in RAM 216 and/or 218) may enable an MBIST self-repair procedure (not shown) to take remedial action if a device fails one or more aspects of MBIST procedure 312.

Following passage of LBIST procedure 304, MBIST procedure 314 and OTP BIST procedure 320 at diamonds 308, 316 and 324, respectively, executable instructions for one or more software modules may be loaded to a memory of a tested device. It should be understood, however, that this is merely an example implementation, and that other embodiments may be implemented without deviating from claimed subject matter. Execution of such loaded instructions may cause execution of one or more subsequent BIST procedures (e.g., one or more BIST procedures that are not provided in BIST engines formed in the device to be tested such as BIST engines 212). In an embodiment, such a party performing testing (e.g., wafer test 114, FIG. 1) may access persistent registers storing test results written at blocks 306, 314 and/or 322 (e.g., access status registers 214 via TAP 202) to confirm passage of corresponding BIST procedures. Upon such confirmation of passage of LBIST procedure 304, MBIST procedure 312 and/or OTP BIST procedure 320 based on contents of accessed persistent registers, such a party performing testing (e.g., in an unsecure testing environment) may load executable instructions (e.g., for execution of a subsequent BIST procedure) to a memory (e.g., RAM 216) through a TAP (e.g., TAP 202). In a particular implementation, instructions in ROM 218 implementing an ABIST copy function may be executed to access ABIST code (e.g., through TAP 202) stored in a RAM external to device 200 (not shown). The accessed ABIST code may then be loaded to a location in RAM 216. In an embodiment, such executable instructions loaded to RAM 216 may be encrypted and signed with an encryption key. Along with loading encrypted instructions to RAM 218, a party performing testing may also provide a message through TAP 202 (e.g., to a process executing on CPU 204 from executable instructions stored on ROM 218) indicating a location in a memory to which encrypted instructions are loaded. Responsive to receipt of this message through a TAP, a device under test may copy loaded instructions and/or commands to main memory (e.g., RAM 216), and decrypt and/or authenticate the copied instructions and/or commands at block 329. In the particular example implementation of device 200 (FIG. 2A), instructions in ROM 218 may be executed by CPU 204 to copy loaded instructions to RAM 216, authenticate the loaded instructions based on a digital certificate stored in ROM 218 and decrypt the loaded instructions according to a key stored in ROM 218. If copied instructions are authenticated at block 329, for example, execution of decrypted instructions may, at block 334, mark test passages (e.g., tests passed at diamonds 308, 316 and 324) in OTP registers (e.g., OTP registers 220) if not already done so, followed by execution of ABIST procedure 336. In an example, execution of ABIST procedure 336 may comprise determination of trims to be applied to certain operational circuit parameters such as, for example, supply voltages and clock frequencies. Such trims along with ABIST results may be expressed in OTP registers (e.g., OTP registers 220) and/or forwarded to a party performing testing through a TAP (e.g., TAP 202). In a particular implementation, OTP registers 220 may maintain a persistent state to express such ABIST results across power cycles, and may be used to determine whether device 200 has been tested and marked as passing or failing a manufacturing test.

Execution of ABIST procedure 336 may comprise, for example, access to results of previous tests (e.g., performed at LBIST procedure 304, MBIST procedure 312 and/or OTP BIST procedure 320) recorded in status registers (e.g., status registers 214 via a bus formed according to an ARM Advanced Microcontroller (AMBA) to JTAG bridge 206). Additionally, execution of ABIST procedure 336 may involve accessing and/or reading scan chains and other parameters generated in the course of other test procedures that are accessible by a testing party through a TAP. In an embodiment, execution of ABIST procedure 336 may comprise execution of one or more analog functions of a manufactured device to determine whether such analog functions have been properly manufactured. At blocks 340 and 342, results of execution of ABIST procedure 336 may be communicated to a testing party. In an implementation, such results of execution of ABIST procedure 336 may be communicated by setting one or more bits in a status register (e.g., status register 214), for example. Additionally, if trims (e.g., determined at ABIST procedure 336) have been stored in OTP bits, trims stored in OTP bits may also be communicated to a testing party. According to an embodiment, completion of ABIST procedure 336 may also comprise locking out and/or disabling a TAP (e.g., TAP 202) to, for example, prevent any subsequent access by a party conducting process 300 from accessing components of a device under test (e.g., lock out and/or disable TAP 202 to prevent any subsequent access to control registers 210, BIST engines 212, status registers 214, OTP registers 220 and/or RAM 216). In another implementation, TAP 202 may be disabled if device 200 is in a particular life cycle state (e.g., device 200 operational in the field), Here, such a disabled TAP 202 may be re-enabled if device 200 experiences an operational fault and/or failure.

It should be noted that the various circuits disclosed herein may be described using computer aided design tools and expressed (or represented), as data and/or instructions embodied in various machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, System C, HLS and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se).

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising:
    initiating one or more built-in self-test (BIST) procedures via a first test access port (TAP) in an integrated circuit (IC) device to provide test results;
    storing the test results in a test status register in the integrated circuit (IC) device;
    accessing content of the test status register, the content of the test status registers including test results of at least one previously executed BIST procedure, via the first TAP to determine status of at least one of the one or more BIST procedures; and
    setting a value in a one-time programmable (OTP) array responsive to a determination of successful completion of the one or more BIST procedures, the determination of successful completion of the one or more BIST procedures being determined based, at least in part, on the accessed content of the test status register,
    wherein a subsequent BIST procedure is executed following the determination of successful completion of the one or more BIST procedures.

2. The method of claim 1, wherein the first TAP provides read-only access to the content of the test status register.

3. The method of claim 1, wherein the first TAP is part of a secure domain of the IC device.

4. The method of claim 3, wherein the IC device comprises a plurality of hierarchical TAPs including at least a second TAP in an unsecure domain of the IC device at a higher level in a hierarchy than the first TAP.

5. The method of claim 1, wherein the test status register is capable of maintaining a persistent state through a reset cycle.

6. The method of claim 1, wherein the at least one of the one or more BIST procedures are executed based on logic or circuitry, or a combination thereof, formed on the IC device.

7. The method of claim 1, wherein the first TAP is disabled from initiating subsequent BIST procedures following setting the value in the OTP array.

8. The method of claim 1, wherein content expressing scan chains in a secure domain of the IC device are inaccessible via the first TAP.

9. The method of claim 1, wherein BIST commands are executable by one or more processors or hardware, or a combination thereof, to execute a subsequent BIST procedure and disable the first TAP from initiating a subsequent BIST procedure by a party that initiated at least one of one or more previously executed BIST procedures.

10. The method of claim 1, wherein a command for at least one of the one or more BIST procedures is encrypted, and wherein initiating the one or more BIST procedures further comprises authenticating the command based, at least in part, on a key stored in a memory of a secure domain.

11. The method of claim 1, and further comprising preventing execution of at least one of the one or more BIST procedures from an unknown state.

12. The method of claim 1, wherein functions available to the first TAP are disabled responsive to a life cycle state, and wherein the disabled functions are reenabled responsive to an operational fault.

13. An integrated circuit (IC) device comprising:
    a control or test status register;
    a test access port (TAP); and
    logic to:
        execute one or more built-in self-test (BIST) procedures to provide one or more test results responsive to one or more commands received at the TAP,
        store the one or more test results in the control or test status register,
        access content of the control or test status register to determine status of at least one of the one or more BIST procedures, the content of the control or test status register to include at least one test result of at least one previously executed BIST procedure,
        set a value in an OTP array in a secure domain of the IC device, responsive to a determination of successful completion of the one or more executed BIST procedures, the determination of successful completion of the one or more executed BIST procedures to be determined based, at least in part, on the accessed content of the control or test status register, and
    logic to authenticate or decrypt the commands received through the TAP based, at least in part, on a key stored in the secure domain of the IC device.

14. The IC device of claim 13, a wherein the key stored in the secure domain of the IC to enable decryption or authentication of encrypted commands received through the TAP following determination of successful execution of at least one of the one or more BIST procedures, successful execution of the at least one of the one or more BIST procedures to be determined based, at least in part, on the test results stored in the control or test status register.

15. The IC device of claim 14, wherein the commands received through the TAP are to be provided via the TAP responsive to successful execution of at least one of the BIST procedures, and wherein the commands are to execute one or more additional BIST procedures.

16. The IC device of claim 15, wherein successful execution of the at least one of the BIST procedures to be determined based, at least in part, on at least one of the one or more test results in the control or test status register.

17. The IC device of claim 13, wherein stored scan chains are inaccessible via the TAP.

18. An article comprising:
    a non-transitory storage medium comprising computer-readable instructions stored thereon, the instructions being executable by one or more processors to:
        execute one or more built-in self-test (BIST) procedures to provide test results responsive to one or more commands received via a test access port (TAP);
        store the test results in a test status register;
        access content of the test status register to determine status of the one or more executed BIST procedures, the content of the test status register to include at least one test result of at least one previously executed BIST procedure;
        set a value in a one-time programmable (OTP) array in a secure domain of an integrated circuit (IC) device responsive to a determination of successful completion of at least one of the one or more executed BIST procedures, the determination of successful completion of the at least one of the one or more executed BIST procedures being determined based, at least in part, on the accessed content of the test status register; and
        authenticate or decrypt commands received through the TAP based, at least in part, a key stored in the secure domain of the IC device.

* * * * *